United States Patent
Cingoz et al.

(10) Patent No.: US 10,288,428 B1
(45) Date of Patent: May 14, 2019

(54) VELOCITY SELECTIVE THERMAL ATOMIC BEAM INERTIAL SENSOR

(71) Applicant: AOSense, Inc., Sunnyvale, CA (US)

(72) Inventors: Arman Cingoz, Sunnyvale, CA (US); Miao Zhu, San Jose, CA (US); Miroslav Y. Shverdin, Mountain View, CA (US); Matthew Cashen, Gilroy, CA (US)

(73) Assignee: AOSense, Inc., Sunnyvale, CA (US)

( * ) Notice: Subject to any disclaimer, the term of this patent is extended or adjusted under 35 U.S.C. 154(b) by 0 days.

(21) Appl. No.: 15/894,488

(22) Filed: Feb. 12, 2018

(51) Int. Cl.
*G01C 19/58* (2006.01)
*G21K 1/00* (2006.01)

(52) U.S. Cl.
CPC .............. *G01C 19/58* (2013.01); *G21K 1/006* (2013.01)

(58) Field of Classification Search
CPC .......... G21K 1/006; G01C 19/58; G01V 7/04; G01V 7/14; G01V 7/02; G01P 15/00; G01P 15/02; G01P 15/043
See application file for complete search history.

(56) References Cited

U.S. PATENT DOCUMENTS

| 5,315,109 A | * | 5/1994 | Thomas | H05H 3/04 250/251 |
| 9,019,506 B1 | * | 4/2015 | Black | G01B 9/02 356/450 |
| 9,046,368 B2 | * | 6/2015 | Bidel | G21K 1/006 |
| 9,772,175 B2 | * | 9/2017 | Black | G01B 9/02 |
| 2016/0298967 A1 | * | 10/2016 | Johnson | G01C 19/58 |

FOREIGN PATENT DOCUMENTS

| CN | 102538775 | | 7/2012 |
| CN | 102538775 A | * | 7/2012 |

* cited by examiner

*Primary Examiner* — David E Smith
(74) *Attorney, Agent, or Firm* — Van Pelt, Yi & James LLP (57) ABSTRACT

An atom interferometer device for inertial sensing includes one or more thermal atomic sources, a state preparation laser, a set of lasers, and a detection laser. The one or more thermal atomic sources provide one or more atomic beams. A state preparation laser is disposed to provide a state preparation laser beam nominally perpendicular to each of the one or more atomic beams. A set of lasers is disposed to provide interrogation laser beams that interrogate the one or more atomic beams to assist in generating atom interference. A detection laser is disposed to provide a detection laser beam, which is angled at a first angle to the each of the one or more atomic beams in order to enhance the dynamic range of the device by enabling velocity selectivity of atoms used in detecting the atom interference.

27 Claims, 10 Drawing Sheets

VELOCITY SELECTIVE THERMAL ATOMIC BEAM INERTIAL SENSOR

This invention was made with government support under contract #FA9453-17-C-0470 awarded by AFRL and #N00014-15-C-5022 awarded by ONR. The government has certain rights in the invention.

BACKGROUND OF THE INVENTION

Matter exhibits wave-like properties similar to light; atomic interferometry has become an indispensable tool for precision measurements because the typical de Broglie wavelengths associated with massive particles are very small compared to wavelengths associated with massless photons of visible light. These wave-like properties of matter allow interference measurements to be exploited at a scale orders of magnitude smaller than for light. Examples of these precision measurements include high precision inertial sensing and gravity gradiometry to measurements of fundamental physical constants and quantum phenomena. Typically, these precision measurements take place in static environments such as in a research laboratory. There are significant challenges of using atomic interferometers in a dynamic environment, such as in a spacecraft or airplane, where vibrations and accelerations can be large. For example, sensor dynamic range is dependent on the atomic source velocity distribution such that the ability to make measurements is significantly reduced for the large accelerations required for operation in dynamic environments.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An atom interferometer device for inertial sensing is disclosed. The atom interferometer device for inertial sensing comprises one or more thermal atomic sources, a state preparation laser, a set of lasers, and a detection laser. The one or more thermal atomic sources provide one or more atomic beams. A state preparation laser is disposed to provide a state preparation laser beam nominally perpendicular to each of the one or more atomic beams. A set of lasers is disposed to provide interrogation laser beams that interrogate the one or more atomic beams to assist in generating atom interference. A detection laser is disposed to provide a detection laser beam, which is angled at a first angle to the each of the one or more atomic beams in order to enhance the dynamic range of the device by enabling velocity selectivity of atoms used in detecting the atom interference.

One of the critical challenges for inertial sensors based on atom interferometry utilizing a thermal atomic beam source under dynamic conditions is a loss of contrast due to the broad longitudinal velocity distribution of the atom flux emitted by the ovens. For example, in a cesium (Cs) thermal oven utilizing mechanical apertures as the beam collimator, the longitudinal velocity distribution is given by the $v^3$ Maxwellian distribution:

$$I(v) = \frac{2I_0}{\alpha^4} v^3 e^{-\frac{v^2}{\alpha^2}}$$

which in some embodiments has a most probable velocity of $\alpha \sim 220$ m/s with a similar distribution width.

This poses a problem for the sensor dynamic range because the output phase of an atom interferometer under accelerations and rotations is velocity dependent. For example, the phase shift due to acceleration a and rotation Ω are given by $$\phi = k \cdot aT^2 = k \cdot a\left(\frac{L}{v}\right)^2,$$

$$\phi = 2k \cdot v \times \Omega T^2 = 2k \cdot v \times \Omega\left(\frac{L}{v}\right)^2,$$

where k=4π/λ is the effective Raman two photon wave-vector, v is the atom velocity and L is the distance between the three Raman laser beams that create the atom interferometer. The output of the atom interferometer is given by the sine of the phase of the interferometer which includes all inertial and other phase shifts.

The two atomic beams are generated by mechanical collimation at the output of the atom sources. The mechanical collimators preferentially allow atoms moving in the forward direction out of the sources to propagate through the sensor, leading to atomic beams with narrow transverse velocity distributions. For example, a collimation ratio of 100:1 leads to a several m/s transverse velocity width. In some embodiments, the thermal atomic source is collimated using a mechanical collimator with collimation ratios in the range: 50:1-250:1. In various embodiments, the mechanical collimator achieves a collimation of: from 50:1 to less than 100:1, from 100:1 to less than 200:1, from 200:1 to less than 300:1, or any other appropriate range.

The Raman beam geometry, specifically the width of the Raman laser beams in the atom transit direction, is typically chosen to address all the atoms in the transverse velocity distribution by adjusting the spectral width of the Raman transitions. As a result, atoms with a broad range of longitudinal velocities and transverse velocities can still satisfy the resonance condition. In practice, the measured longitudinal velocity distribution width that is addressed by the Raman beams is on the order of 80 m/s, which limits the dynamic range of the sensor.

Additional velocity selectivity of atoms is achieved using a detection beam with an angle from perpendicular to the atomic beam. For example, the angle from perpendicular comprises a less than ten-degree angle from perpendicular. In various embodiments, the angle from perpendicular comprises a ten to less than twenty-degree angle from perpendicular, a twenty to less than thirty degree angle from perpendicular, a thirty to less than fifty degree angle from perpendicular, or any other appropriate angle. In some embodiments, the angle is adjusted from perpendicular for each of the two atomic beams in order to adjust the dynamic range.

The detection laser beam is modulated to create a sideband to match a Doppler shift associated with the angle from perpendicular to each of the atom beams. For example, if the detection beam is tilted into the atomic beam direction by angle θ, the fluorescence resonance condition for atoms with different velocities are shifted by:

$$\Delta f = \frac{v}{\lambda}\sin\theta.$$

In order to optimize the interferometer signal, the detection laser frequency must be stabilized at the frequency corresponding to the velocity at the peak of the distribution (example, ~220 m/s for Cs). In some embodiments, the detection laser beam is modulated for a plurality of Doppler shifts to address different populations in the one of the two atom beams. In some embodiments, a detection beam steering mirror is adjusted dynamically to increase or decrease a dynamic range depending on sensor motion, and a detection beam frequency is adjusted to an appropriate Doppler shift. In some embodiments, an optical power in a detection laser beam is adjusted dynamically to increase or decrease a dynamic range depending on a sensor motion.

In some embodiments, a second detection laser beam is angled at a second angle to the one of the two atomic beams to enhance dynamic range by enabling velocity selectivity of atoms used in detecting the atom interference, wherein the first angle and the second angle are different. In some embodiments, the second detection laser beam is also generated by the detection laser.

By enabling the adjustment of dynamic range, the atom interferometer device for inertial sensing is improved. In particular, inertial sensing response of the atom interferometer device is improved and can be designed, statically adjusted, or dynamically adjusted to improve performance under one or more dynamic conditions and/or operating ranges.

Figure 1:
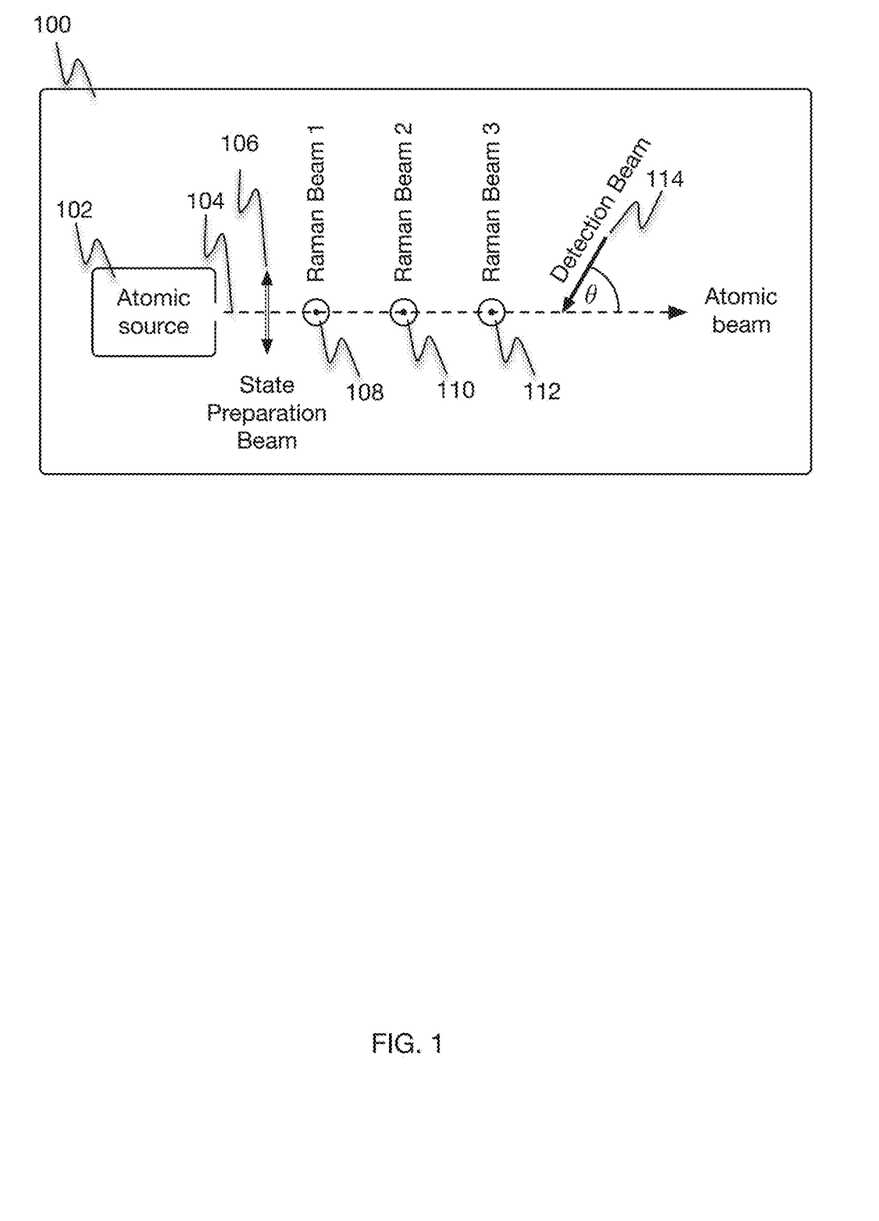
FIG. 1 is a block diagram illustrating an embodiment of a sensor head configuration for velocity-selective detection.

FIG. 1 is a block diagram illustrating an embodiment of a sensor head configuration for velocity-selective detection. In the example shown, the velocity selective atomic state detection scheme provides an extension of the dynamic range of the device under acceleration and rotation. FIG. 1 shows a side view of atomic sensor 100 for one of the two counter-propagating atomic beams in the device. This design can be applied to any number of atomic beams simultaneously but is shown here applied to just one beam for clarity. Atomic source 102 generates atomic beam 104. In some embodiments, atomic source 102 is a thermal beam from an effusive oven. Atomic source 102 can be produced by heating a source of appropriate atoms to form a vapor. Any atoms with transitions amenable to atomic physics techniques using available lasers may be used; for example, alkali atoms such as cesium, rubidium, etc. The vapor is collimated by a nozzle or array of collimating holes to form atomic beam 104.

State preparation beam 106 puts atoms from atomic beam 104 into a desired quantum state. For example, state preparation beam 106 simultaneously clears the F=4 ground state and optically pumps the F=3 ground state atoms into the $m_F=0$ magnetic sublevel for cesium. In this example, state preparation beam 106 is kept orthogonal to atomic beam 104 in order to ensure all atoms irrespective of their velocities are cleared out of the ground state used for fluorescence detection.

The state-prepared atomic beam then enters the atom interferometer which is created using a sequence of three interferometer interrogation beams. Raman beam 1 108, Raman beam 2 110, and Raman beam 3 112 comprise the interferometer interrogation beams. For example, interferometer interrogation beams are two-photon stimulated Raman transitions that are tuned to coherently split atoms of atomic beam 104 into a superposition of states and then recombine the atomic wave packets. At the output of the interferometer one can monitor the atomic populations in the atomic states using detection beam 114 (e.g., in either the F=3, $m_F=0$ or F=4, $m_F=0$ atomic states by using a detection beam, which can be tuned to the F=3 or F=4 resonance to induce fluorescence proportional to the number of atoms in the F=3 or F=4 state). The number of atoms in a particular atomic state after atoms exit the interferometer depends on the rotation or acceleration of the optical platform relative to the inertial trajectory of atoms in vacuum. In some embodiments, the number of atoms in a particular state can be measured by a photodetector that detects fluorescence scattered by atoms resonant with one or more detection laser beams.

In some embodiments, detection beam 114 is used to detect fluorescence scattered by atoms. In some embodiments, detection beam 114 is used to detect absorption of atoms resonant with the detection laser beam. An angle θ is introduced between the detection beam 114 and atomic beam 104 to provide velocity selectivity in the detected atom signal via the Doppler shift associated with the detection beam wave-vector and the atomic velocity. This reduces the spread in atomic velocities which are effectively detected such that contrast is maintained for larger input accelerations in comparison to a sensor with no velocity selective detection beam. For example, the Doppler effect is used by angling the detection beam 114 with respect to the atomic beam 104 after the interferometer sequence Raman beam 108, Raman beam 110, and Raman beam 112 in order to decrease the longitudinal velocity width of atoms contributing to the signal. When the detection beam is tilted into the atomic beam direction by an angle θ, the fluorescence resonance condition for atoms with different velocities are shifted by $\Delta f = v/\lambda \sin \theta$ and the width of the atomic beam velocity distribution is decreased. In some embodiments, more than one detection beam is used to detect atoms.

Figure 2:
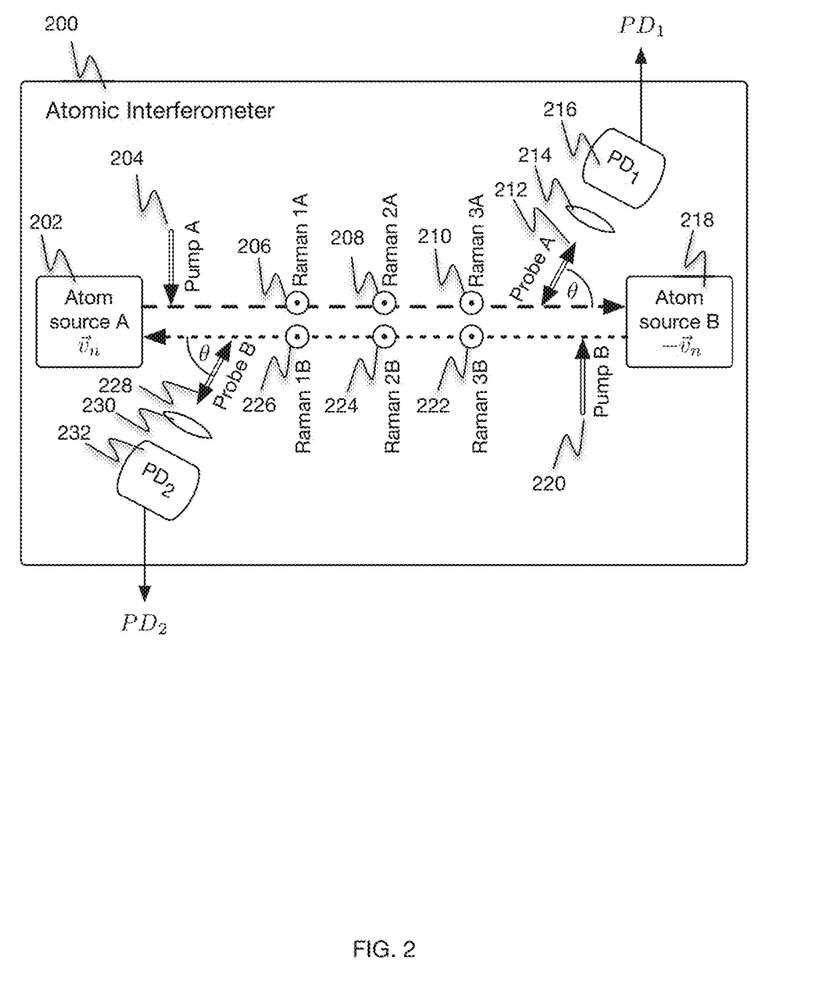
FIG. 2 is a block diagram illustrating an embodiment of an atomic interferometer.

FIG. 2 is a block diagram illustrating an embodiment of an atomic interferometer. In some embodiments, atomic interferometer 100 is used to implement each of the two counter-propagating atomic interferometers of FIG. 2. In the example shown, atom source A 202 and atom source B 218 output atomic beams that traverse along the long axis of the sensor. The beam separation in FIG. 2 is exaggerated (e.g., the beams are approximately spatially overlapping). Atom source A 202 and atom source B 218 are produced by heating a source of appropriate atoms to form a vapor. Any atoms with transitions amenable to atomic physics techniques using available lasers may be used (e.g., alkali atoms such as cesium, rubidium, etc.). The vapor is collimated by a nozzle or array of collimating holes. Pump A 204 and pump B 220 are state preparation beams that put atoms into a desired quantum state. Probe A 212 and probe B 228 are detection beams that measure the number of atoms exiting the interferometer in a particular quantum state. In order to optimize the performance of the atom interferometer, for the case of atomic cesium the atoms are optically pumped into the F=3 hyperfine ground state into the $m_F=0$ magnetic sublevel. The optically pumped atomic beam then enters the atom interferometer which is created using a sequence of three interferometer interrogation beams. The three sets of beams comprise the interferometer interrogation beams. The first set comprises beam 206 and beam 226. The second set comprises beam 208 and beam 224. The third set comprises beam 210 and beam 222. For example, interferometer interrogation beams are two-photon stimulated Raman transitions that are tuned to coherently split into a superposition of states and then recombine the atomic wave packets. At the output of the interferometer one can monitor the atomic population in either the F=3, $m_F=0$ or F=4, $m_F=0$ atomic states, again in the case of atomic cesium, by using a laser probe beam (e.g., probe A 212 or probe B 228) disposed at an angle θ with respect to the atomic beam from atom source A 202 and atom source B 218. An angle θ is introduced between the detection probe beam 212 and probe B 228 and atomic beam from source A 202 and atom source B 218 to provide velocity selectivity in the detected atom signal via the Doppler shift associated with the detection beam wave-vector and the atomic velocity. This reduces the spread in atomic velocities which are effectively detected such that contrast is maintained across larger accelerations. Laser probe A 212 and probe B 228 can be tuned to the F=4, $m_F=0$ resonance to induce fluorescence proportional to the number of atoms in the F=4 state which can then be measured using a photodiode (e.g. collected by lens 214 and measured using $PD_1$ 216 or collected by lens 230 and measured using $PD_2$ 232). The photodiode current is converted to a voltage that can be digitized so that signal processing and filtering techniques can be applied to remove unwanted noise from the signal. Since the atoms entering the interferometer have been pumped into the F=3, $m_F=0$ sublevel the F=4, $m_F=0$ sublevel has nearly zero background and is therefore ideal for interference fringe detection. The number of atoms in the F=4 state at the output of the interferometer can be expressed as $N_4=N/2(1-\cos(\phi))$ where N is the total number of atoms entering the interferometer after being optical pumped into the N=3, $m_F=0$ state. The phase $\phi$ contains the laser phases and inertial sensitivity phase. In some embodiments, additional interactions are applied to increase the momentum transferred to the atoms and increase the interferometer sensitivity due to larger enclosed area. Output signals from photodiodes $PD_1$ 216 and $PD_2$ 232 measure the population of atoms in one or both atomic ground states using a probe laser beam via fluorescence or absorption. The number of atoms in either state is proportional to the fluoresced or absorbed power and the population in either or both states can be measured with one or more laser beams and one or more photodiodes. In various embodiments, the readout from atomic interferometer 200 uses the D2 atomic transition for Cesium, uses the D2 atomic transition for Rubidium, or any other appropriate atomic transition. Atomic interferometer 200 outputs a pair of photodetector signals ($PD_1$, $PD_2$) containing information about the atomic states of the atoms in the interferometer undergoing various inertial conditions. Note that the acceleration sense axis is parallel to the Raman laser beams and that the rotation sense axis is vertical for FIG. 2. Note that the position of photodiodes does not have to be as shown in FIG. 2, but instead needs only to be appropriate for collecting florescence or absorption.

Figure 3A:
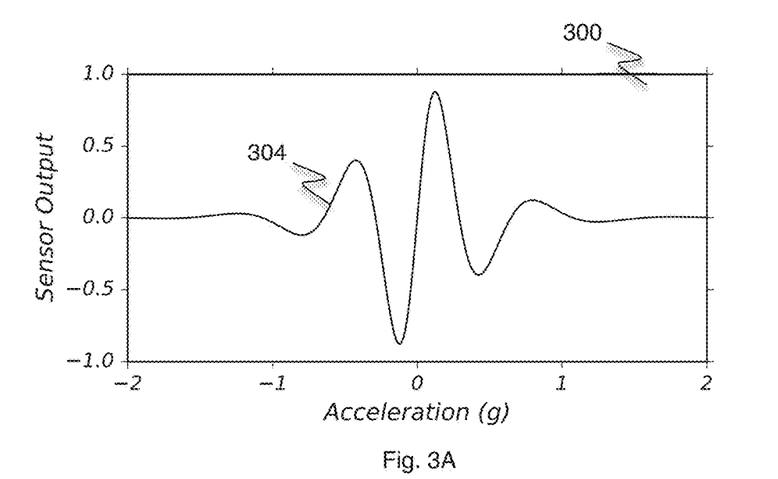
FIG. 3A is a graph illustrating an embodiment of the loss of signal and dynamic range of an atom interferometer experiencing accelerations that are typical of mobile environments.

FIG. 3A is a graph illustrating an embodiment of the loss of signal and dynamic range of an atom interferometer experiencing accelerations that are typical of mobile environments. In the example shown, sensor output 304 shows the total response magnitude of an inertial sensor without an angled detection beam as a function of acceleration. Sensor output 304 is given by the cosine of the phase of the interferometer which includes the contributions from all inertial and other phase shifts.

Figure 3B:
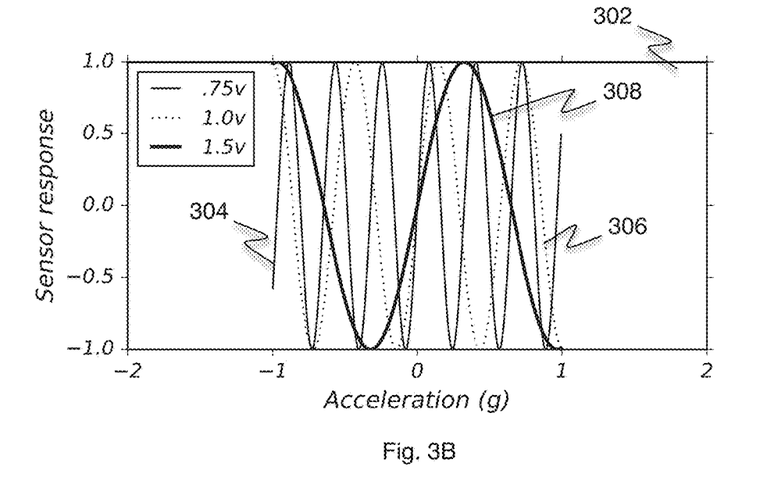
FIG. 3B is a graph illustrating an embodiment of why the signal and dynamic range in a sensor output of an atom interferometer are lost for accelerations exceeding ±1 g.

FIG. 3B is a graph illustrating an embodiment of why the signal and dynamic range in a sensor output of an atom interferometer are lost for accelerations exceeding ±1 g. In the example shown in FIG. 3B, the normalized output of an atom interferometer for accelerations for three different example velocities centered about v=220 m/s are shown in curve 306, curve 308, and curve 310. The $v^{-2}$ dependence of the inertial phase leads to sinusoidal responses that become drastically out of phase with each other for accelerations over 1 g. As a result, for large accelerations, the contribution to the total sensor output from different velocity components destructively interfere with each other. For example, without an angled detection beam, the effective width of the atomic beam velocity distribution addressed by the interferometer is on the order of 80 m/s. Curve 304 results from integrating the responses at particular velocities over the entire velocity distribution width of ~80 m/s, centered about 220 m/s, for a Raman beam separation of L=6 cm. The output of the sensor is lost for accelerations exceeding ±1 g due to the destructive interference between the out-of-phase sinusoidal signals from different velocity components. Broader velocity distributions result in reduced sensor output and dynamic range. As a result, it is desirable to select narrow velocity ranges from the atomic beam for use within the atomic interferometer.

Figure 4:
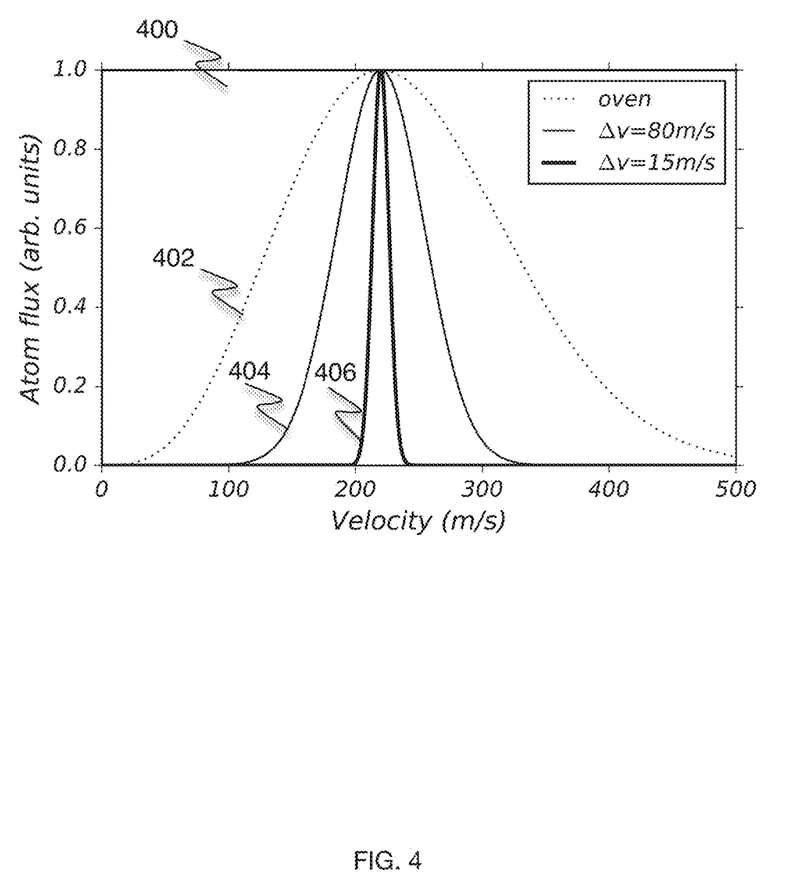
FIG. 4 is a graph illustrating an embodiment of the active longitudinal velocity distribution of the atomic beam at different points in the atomic interferometer.

FIG. 4 is a graph illustrating an embodiment of the active longitudinal velocity distribution of the atomic beam at different points in the atomic interferometer. In the example shown, curve 402 is the initial distribution out of the thermal atomic source with a width of ~220 m/s. Curve 404 is the velocity distribution selected by the Raman beams. This velocity distribution has a width of ~80 m/s. Without further velocity selection, the velocity distribution is too broad to allow measurements of acceleration greater than 1 g typical of mobile environments. The Doppler effect can be used in the detection phase of the interferometer sequence to further decrease the longitudinal velocity distribution width of atoms contributing to the signal. Nominally, the detection beam is orthogonal to the atomic beam propagation direction. Curve 404 is the velocity distribution when the detection beam and atomic beam are perpendicular. Curve 406 is the velocity distribution when a detection beam with angle ~25 degrees is used. Curve 406 has a narrow velocity distribution width of ~15 m/s and supports a dynamic range greater than +1 g.

Figure 5:
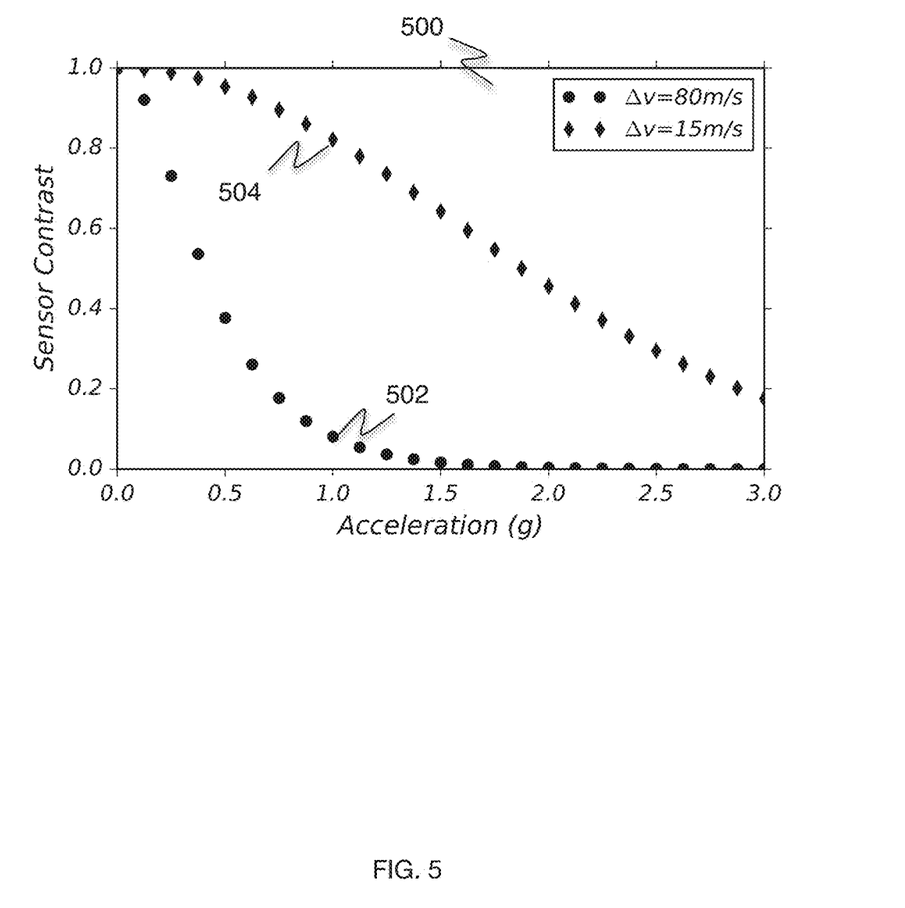
FIG. 5 is a graph illustrating an embodiment of the improvement in the dynamic range due to the disclosed method of velocity selection as a function of acceleration.

FIG. 5 is a graph illustrating an embodiment of the improvement in the dynamic range due to the disclosed method of velocity selection as a function of acceleration. In the example shown, the results for a velocity distribution width of 80 m/s in curve 504 are compared to a velocity distribution width of 15 m/s in curve 502 for a sensor baseline of L=6 cm. The 3 dB point of the sensor is extended from ~0.4 g to ~2 g, allowing for sensor operation with arbitrary direction with respect to Earth's gravity.

Figure 6:
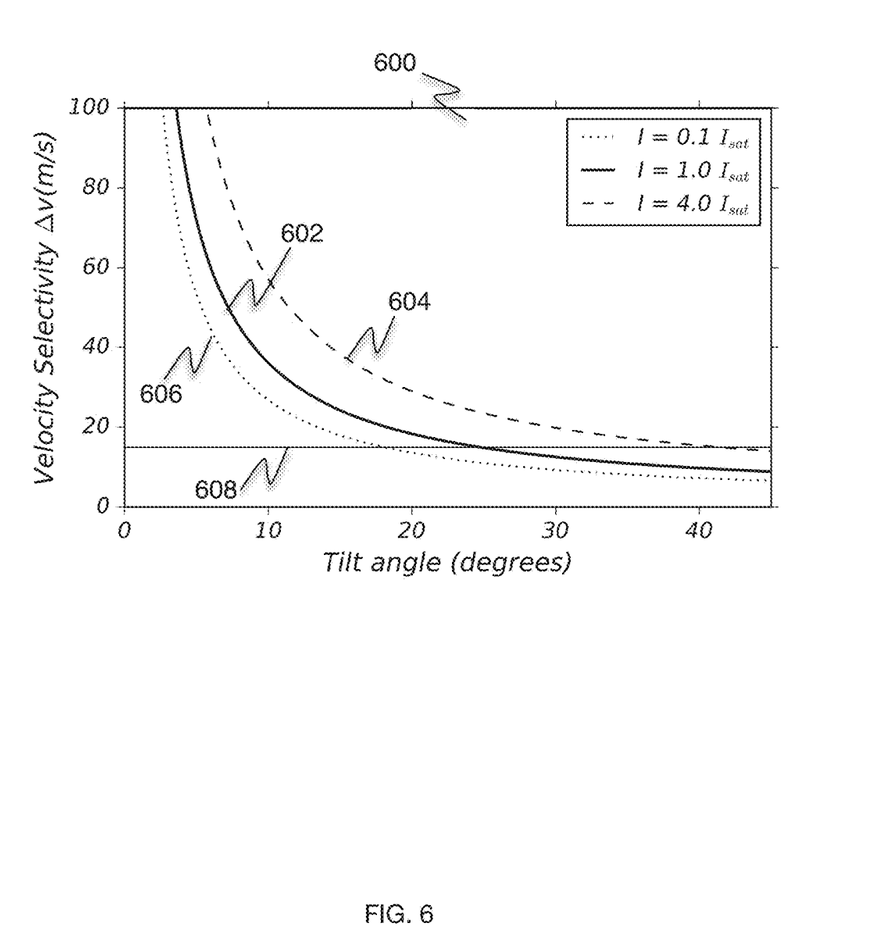
FIG. 6 is a graph illustrating an embodiment of velocity selectivity of an atomic beam as a function of detection beam tilt angle for various beam intensities.

FIG. 6 is a graph illustrating an embodiment of velocity selectivity of an atomic beam as a function of detection beam tilt angle for various beam intensities. In the example shown, curve 602 shows the velocity selectivity for a beam emitting at the saturation intensity. Curve 606 shows the velocity selectivity for a beam emitting at 10% of the saturation intensity, and curve 604 shows the velocity selectivity for a beam emitting at 4× the saturation intensity. In addition to varying the beam angle, changing the frequency of the detection laser beam allows optimization of different velocity classes. If the detection beam is tilted into the atomic beam direction by angle θ, the fluorescence resonance condition for atoms with different velocities are shifted by $$\Delta f = \frac{v}{\lambda} \sin\theta.$$

In order to optimize the interferometer signal, the detection laser frequency must be stabilized at the frequency corresponding to the velocity at the peak of the distribution (e.g., ~220 m/s for Cs). The velocity selectivity of this method is ultimately limited by the natural linewidth $\gamma_0$ of the detection transition, which is ~6 MHz for the Cs D2 transition. The velocity selectivity is given by $$v = \gamma_0 \sqrt{1 + I/I_{sat}} \frac{\lambda}{\sin\theta}.$$

For beam intensities I that are much larger than the saturation intensity (e.g., $I_{sat}$=1.65 mW/cm² for Cs), there is significant broadening and reduced velocity selectivity. Horizontal curve 608 indicates the target velocity selectivity of 15 m/s. For example, for a beam intensity of I=$I_{sat}$, ~25 deg tilt angle is sufficient to reduce the velocity width to 15 m/s with a corresponding frequency shift of 100 MHz.

One disadvantage of the velocity selective detection is the decrease in the fluorescence signal due to the reduced number of atoms detected. However, the effects of the signal reduction on the signal to noise ratio (SNR) of the sensor are dependent on the details of the dominant noise source. There are several methods that can be utilized to maintain SNR and dynamic range simultaneously. In order for these methods to be effective however, care must be taken in sensor design to reduce detector noise floor and the photon shot noise due to any scattered laser light in order to be limited by the shot noise of the incoherent fluorescence background. This background is mainly due to atoms that are excited into the ground state (e.g., F=4 ground state of Cs) by one of the Raman beams, but do not contribute to the interferometer signal. For a given longitudinal velocity v, there is an optimal Raman laser intensity that drives the interferometer sequence. Thus, atoms with velocities that are significantly different from the mean velocity chosen by the Raman laser power have a significant probability of transitioning to the ground state (e.g., the F=4 state of Cs) by one of the Raman beams, but do not contribute to the interferometer signal. Since velocity selective detection suppresses fluorescence from atoms with velocities that are outside the selectivity window, as long as the noise floor is set by the fluorescence of these atoms, the decrease in the signal size is accompanied by a similar decrease in the noise floor, leading to minimal degradation of the sensor SNR.

As shown in FIG. 6, the velocity selectivity is a function of detection power due to power broadening of the resonance width. Thus, the optical power in the detection beam can be dynamically tuned during operation to optimize SNR during low dynamics or to optimize dynamic range during high dynamics by increasing or decreasing the detection power, respectively. In some embodiments, two detection regions, one with angled detection beam and the other with a normal incidence detection beam can be used in series. This method requires a frequency shifting element such as an acousto-optic modulator to account for the appropriate Doppler shift between the two detection beams. In some embodiments, the steering mirror for the detection beam can be dynamically adjusted during operation to optimize SNR or dynamic range. This also requires a frequency shifting element and feedforward control to dynamically tune the frequency of the detection laser as the steering mirror changes angle to maintain the constant velocity addressing.

Figure 7:
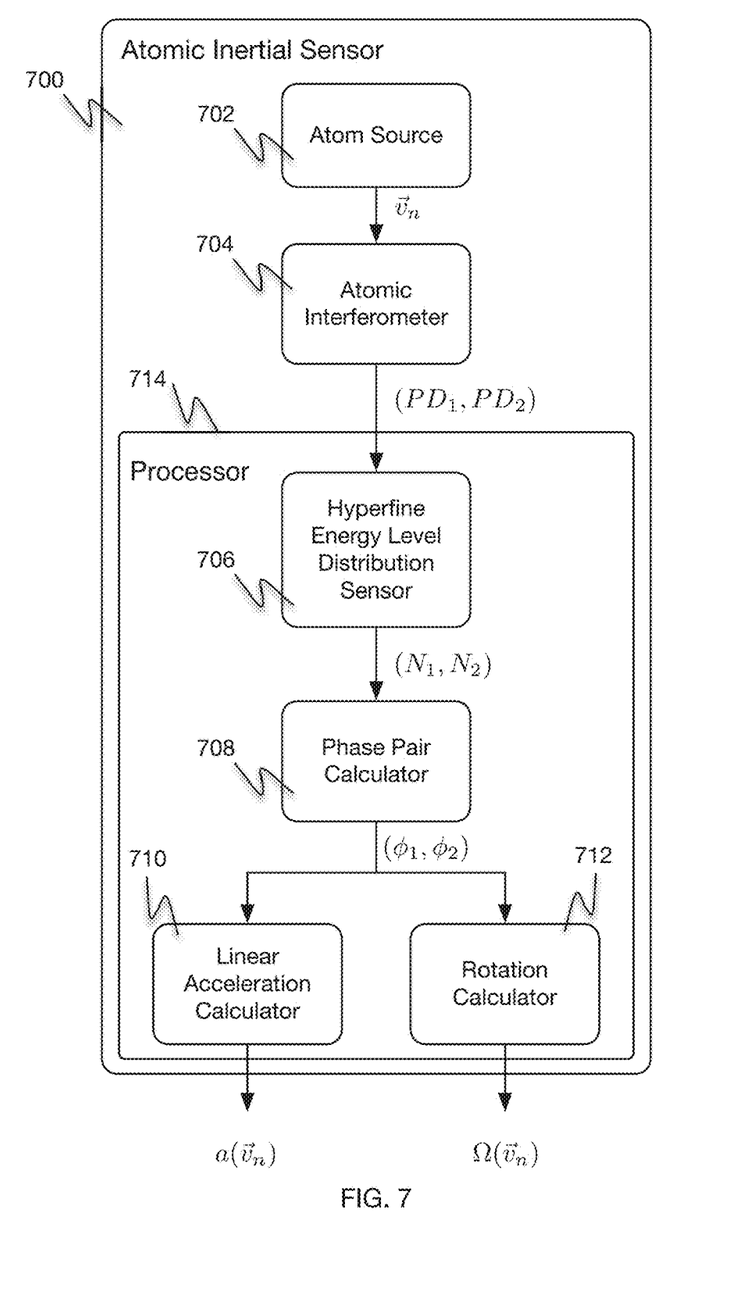
FIG. 7 is a block diagram illustrating an embodiment of an atomic inertial sensor.

FIG. 7 is a block diagram illustrating an embodiment of an atomic inertial sensor. In the example shown, atomic inertial sensor 700 is used to sense acceleration and rotation with respect to atomic beam direction $\vec{v}_n$. For example, an atomic inertial sensor 700 measures acceleration $a(\vec{v}_n)$ with respect to atomic beam direction $\vec{v}_n$ and rotation $\Omega(\vec{v}_n)$ with respect to atomic beam direction $\vec{v}_n$ and outputs $a(\vec{v}_n)$ and $\Omega($ $\vec{v}_n$). In some embodiments, $a(\vec{v}_n)$ and $\Omega(\vec{v}_n)$ are also functions of k. Atom source 702 with beam direction $\vec{v}_n$ is sent to atomic interferometer 704. In some embodiments, atom source 702 is a thermal beam from an effusive oven. Atom source 702 can be produced by heating a source of appropriate atoms to form a vapor. Any atoms with transitions amenable to atomic physics techniques using available lasers may be used; for example, alkali atoms such as cesium, rubidium, etc. The vapor is collimated by a nozzle or array of collimating holes. In some embodiments, the beam is transversely cooled using laser-cooling techniques. Atomic interferometer 704 is comprised of counter-propagating atomic trajectories and outputs a pair of photodetector signals ($PD_1$, $PD_2$) containing information about the atomic states of the atoms in the interferometer. For example, three or more interferometer laser interactions such as two-photon stimulated Raman transitions are applied to the atoms, and the number of atoms in a particular atomic state after atoms exit the interferometer depends on the rotation or acceleration of the optical platform relative to the inertial trajectory of atoms in vacuum. The number of atoms in a particular state can be measured by a photodetector that detects fluorescence scattered by atoms resonant with one or more detection laser beams. In some embodiments, a processor 714 is configured to determine an inertial measurement based at least in part on the atom interference detected using the detection laser. For example, hyperfine energy level distribution sensor 706 converts the pair of photodetector signals ($PD_1$, $PD_2$) from atomic interferometer 704 into a pair of values ($N_1$, $N_2$) that are proportional to the number of atoms in the hyperfine energy state (e.g., hyperfine energy state of alkali atoms such as cesium, rubidium, etc.) and outputs them to phase pair calculator 708. Phase pair calculator 708 inputs values ($N_1$, $N_2$) from hyperfine energy level distribution sensor 706 and outputs a pair of atomic phases ($\varphi_1$, $\varphi_2$) which are used to calculate linear acceleration and rotation with respect to beam direction $\vec{v}_n$. Linear acceleration calculator 710 inputs a pair of atomic phases ($\varphi_1$, $\varphi_2$) and outputs an estimate of linear acceleration $a(\vec{v}_n)$. For example, linear acceleration calculator 710 returns an estimate of linear acceleration $a(\vec{v}_n)$ that is proportional to the sum of the phases ($\varphi_1+\varphi_2$). Rotation calculator 712 inputs a pair of atomic phases ($\varphi_1$, $\varphi_2$) and outputs an estimate of rotation $\Omega(\vec{v}_n)$ with respect to atomic beam direction $\vec{v}_n$. For example, rotation calculator 712 returns an estimate of rotation $\Omega(\vec{v}_n)$ that is proportional to the difference of the phases ($\varphi_1-\varphi_2$).

Figure 8:
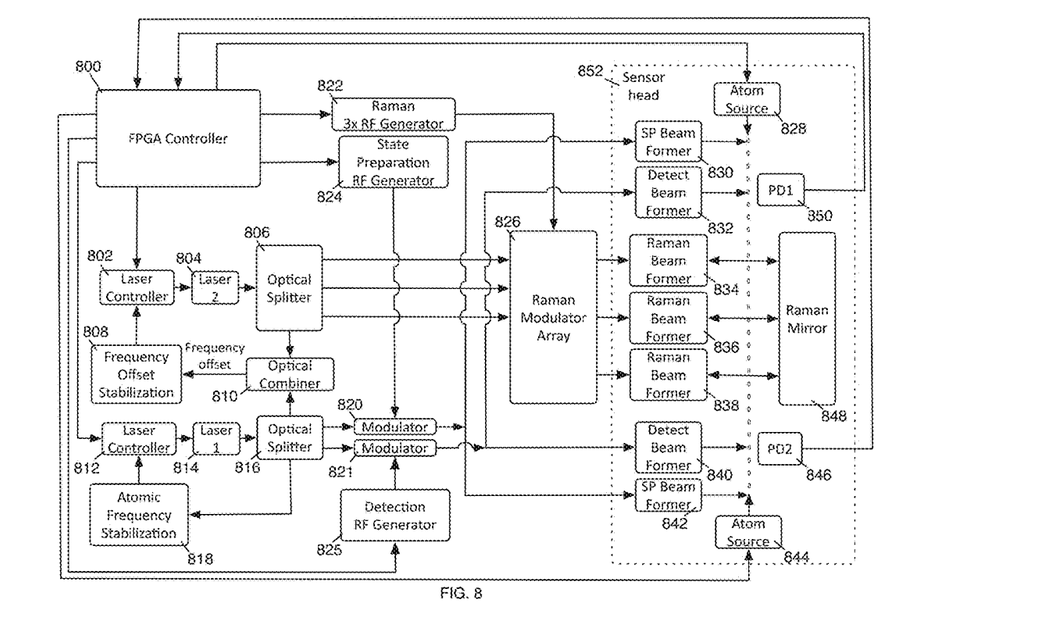
FIG. 8 is a system diagram illustrating an embodiment for a velocity selective thermal atomic beam inertial sensor.

FIG. 8 is a system diagram illustrating an embodiment for a velocity selective thermal atomic beam inertial sensor. In some embodiments, sensor head 852 of FIG. 8 is used to implement atomic interferometer 200 of FIG. 2. In the example shown, the system for a velocity selective thermal atomic beam inertial sensor uses FPGA controller 800 or any other suitable processor to control external circuit boards, atom source temperatures, atom photodiode readers, and calculate atom phases, rotation rates, and accelerations. Laser controller 802 controls temperature and current of laser of laser 2 804 and can be programmed through FPGA controller 800. Laser controller 812 controls temperature and current of laser of laser 1 814 and can be programmed through FPGA controller 800. Laser 1 814 is locked to F=4→5 Cesium D2 transition. Laser 2 804 is locked to laser 1 with a frequency offset of approximately 875 MHz. Optical splitter 816 and optical splitter 806 are a collection of fiber optics or planar light wave circuits that split and direct laser outputs. Atomic frequency offset stabilization 818 is a vapor cell-based spectrometer that provides an atomic reference and generates and error signal so that laser 1 is locked to Cesium 4→5 transition. Optical combiner 810 combines samples of laser light from laser 1 814 and laser 2 804 to generate beat note to provide a frequency offset measurement. Frequency offset stabilization 808 is a circuit that detects frequency offset and provides an error signal to laser 2 804 so that laser 2 804 can be stabilized with respect to laser 1 814. Modulator 820 and modulator 821 are lithium niobate waveguide modulators used to generate laser frequencies that cause optical pumping in state preparation process and generate the Doppler shifted detection beam frequency, respectively. Raman modulator array 826 is a lithium niobate waveguide modulator array used to generate frequency shifted sidebands on laser beams to create Raman transitions. State preparation (SP) beam former 830 and state preparation (SP) beam former 842 are an optical assembly that generates a state preparation laser beam nominally normal to the atomic beam. Detect beam former 832 and detect beam former 840 are an optical assembly that generates a detection laser beam where the detection beam is at an angle with respect to atom beam. Raman beam former 834, Raman beam former 836, and Raman beam former 838 are an optical assembly that generates a Raman laser beam. Raman mirror 848 is one or more retro-reflecting mirrors to retro-reflect the one or more Raman beams formed by Raman beam former 834, Raman beam former 836, and Raman beam former 838. Atom source 828 and atom source 844 generate beam of atoms. Photodiode (PD1) 850 and photodiode (PD2) 846 are each photodiode assemblies that receive atom fluorescence. Raman RF Generator 822 is a circuit board that generates RF signals for the Raman modulator array 826 to modulate the three Raman lasers generated using optical splitter 806 to produce Raman transitions of the atomic beams. State Prep RF Generator 824 is a circuit board that generates RF signals to prepare the quantum state of the atoms in the two atomic beams. Detection RF Generator 825 is a circuit board that generates RF signals to detect the population of atoms enabling the inertial measurement.

Figure 9:
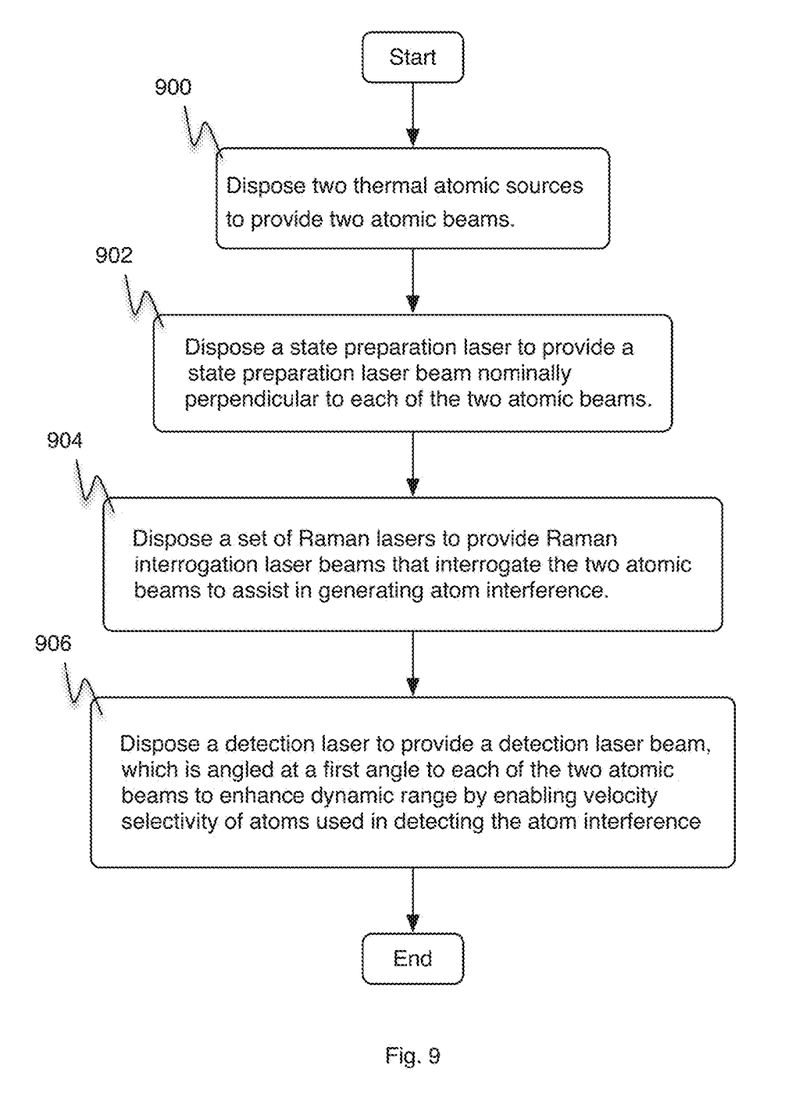
FIG. 9 is a flow diagram illustrating an embodiment of a velocity selective thermal atomic beam inertial sensor.

FIG. 9 is a flow diagram illustrating an embodiment of a velocity selective thermal atomic beam inertial sensor. In the example shown in 900, two thermal atomic sources to provide two atomic beams are disposed. For example, an atomic source generates an atomic beam using an oven. In various embodiments, atomic source is a thermal beam from an effusive oven, a vapor loaded 2D magneto-optical trap, a laser cooled atomic beam, or any other appropriate atomic source. Atomic source can be produced by heating a source of appropriate atoms to form a vapor. Any atoms with transitions amenable to atomic physics techniques using available lasers may be used; for example, alkali atoms such as cesium, rubidium, etc. The vapor is collimated by a nozzle or array of collimating holes to form the atomic beam.

In 902, a state preparation laser is disposed to provide a state preparation laser beam nominally perpendicular to each of the two atomic beams. For example, a state preparation laser is positioned such that a state preparation laser beam puts atoms from the atomic beam into a desired quantum state. In some embodiments, the state preparation beam simultaneously clears the F=4 ground state and optically pumps the F=3 ground state atoms into the $m_F$=0 magnetic sublevel of Cs. The state preparation beam is kept orthogonal to the atomic beam in order to ensure all atoms irrespective of their velocities are cleared out of the F=4 ground state used for fluorescence detection.

In 904, a set of Raman lasers is disposed to provide Raman interrogation laser beams that interrogate the two atomic beams to assist in generating atom interference. For example, a set of Raman lasers is positioned such that atomic interferometer interrogation beams comprising two-photon stimulated Raman transitions are tuned to coherently split atoms of an atomic beam into a superposition of states and then recombine the atomic wave packets. At the output of the interferometer one can monitor the atomic population in either the F=3, $m_F$=0 or F=4, $m_F$=0 atomic states by using a detection beam, which can be tuned to the F=4, $m_F$=0 resonance to induce fluorescence proportional to the number of atoms in the F=4 state. The number of atoms in a particular atomic state after atoms exit the interferometer depends on the rotation or acceleration of the optical platform relative to the inertial trajectory of atoms in vacuum. In some embodiments, the number of atoms in a particular state can be measured by a photodetector that detects fluorescence scattered by atoms resonant with one or more detection laser beams.

In 906, a detection laser is disposed to provide a detection laser beam, which is angled at a first angle to each of the two atomic beams to enhance dynamic range by enabling velocity selectivity of atoms used in detecting the atom interference. For example, a detection laser is positioned to provide a detection laser beam to detect fluorescence scattered by atoms resonant with one or more detection laser beams. In some embodiments, the detection beam is used to detect absorption of atoms resonant with one or more detection laser beams. An angle θ is introduced between the detection beam and the atomic beam to provide velocity selectivity in the detected atom signal via the Doppler shift associated with the detection beam wave-vector and the atomic velocity. This reduces the spread in atomic velocities which are effectively detected such that contrast is maintained across larger accelerations. For example, the Doppler effect is used by angling the detection beam with respect to the atomic beam after the interferometer interrogation sequence in order to decrease the longitudinal velocity width of atoms contributing to the signal. When the detection beam is tilted into the atomic beam direction by an angle θ, the fluorescence resonance condition for atoms with different velocities are shifted by $$\Delta f = \frac{v}{\lambda}\sin\theta$$

and the width of the atomic beam velocity distribution is decreased.

Figure 10:
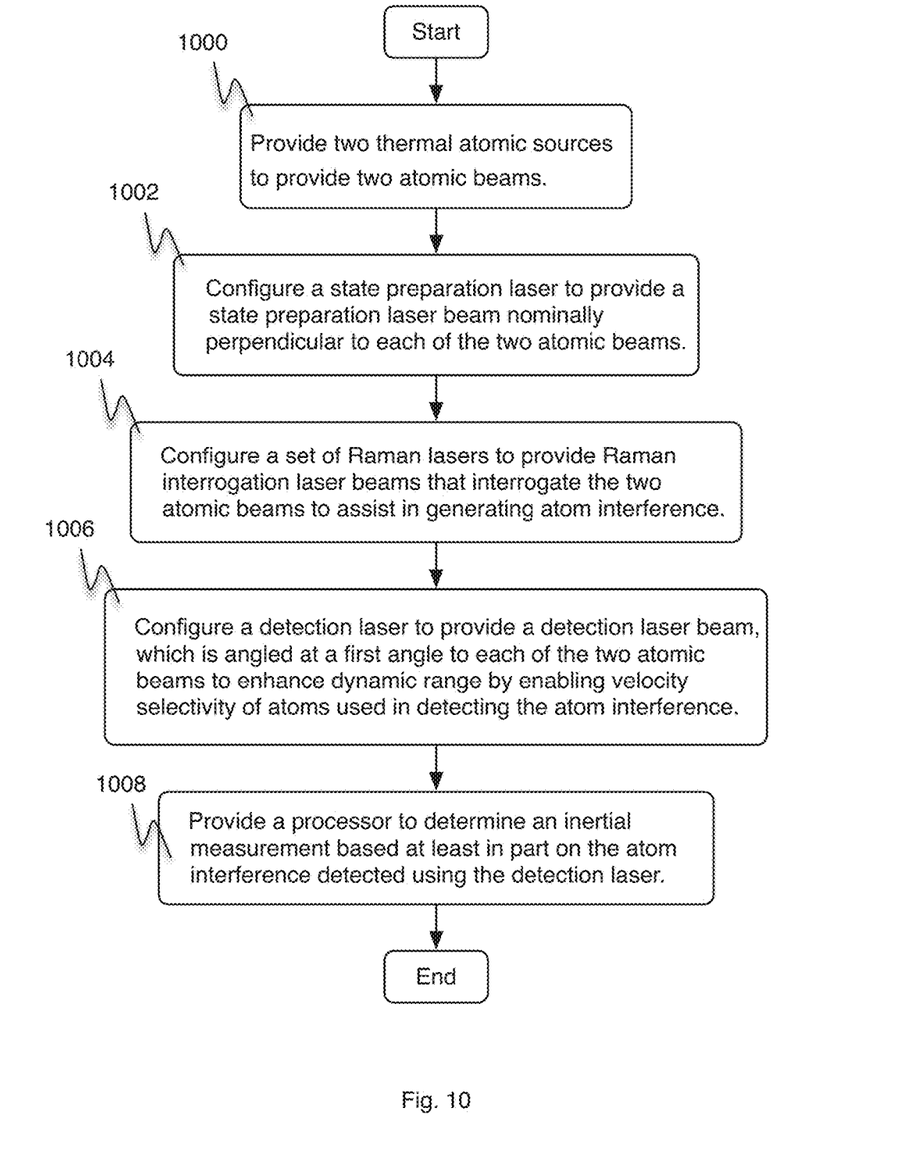
FIG. 10 is a flow diagram illustrating an embodiment of a process for a velocity selective thermal atomic beam inertial sensor.

FIG. 10 is a flow diagram illustrating an embodiment of a process for a velocity selective thermal atomic beam inertial sensor. In the example shown in 1000, two thermal atomic sources are provided to provide two atomic beams. For example, an atomic source generates an atomic beam using an oven. Atomic source is a thermal beam from an effusive oven. Atomic source can be produced by heating a source of appropriate atoms to form a vapor. Any atoms with transitions amenable to atomic physics techniques using available lasers may be used; for example, alkali atoms such as cesium, rubidium, etc. The vapor is collimated by a nozzle or array of collimating holes to form the atomic beam.

In 1002, a state preparation laser is configured to provide a state preparation laser beam nominally perpendicular to each of the two atomic beams. For example, a state preparation laser generates a state preparation beam that puts atoms from the atomic beam into a desired quantum state. In some embodiments, the state preparation beam simultaneously clears the F=4 ground state and optically pumps the F=3 ground state atoms into the $m_F$=0 magnetic sublevel of Cs. The state preparation beam is kept orthogonal to the atomic beam in order to ensure all atoms irrespective of their velocities are cleared out of the F=4 ground state used for fluorescence detection.

In 1004, a set of Raman lasers are configured to provide Raman interrogation laser beams that interrogate the two atomic beams to assist in generating atom interference. For example, a set of Raman lasers is configured to generate interferometer interrogation beams comprising two-photon stimulated Raman transitions that are tuned to coherently split atoms in an atomic beam into a superposition of states and then recombine the atomic wave packets. At the output of the interferometer one can monitor the atomic population in either the F=3, $m_F$=0 or F=4, $m_F$=0 atomic states by using a detection beam 114 which can be tuned to the F=4, $m_F$=0 resonance to induce fluorescence proportional to the number of atoms in the F=4 state. The number of atoms in a particular atomic state after atoms exit the interferometer depends on the rotation or acceleration of the optical platform relative to the inertial trajectory of atoms in vacuum. In some embodiments, the number of atoms in a particular state can be measured by a photodetector that detects fluorescence scattered by atoms resonant with one or more detection laser beams.

In 1006, a detection laser is configured to provide a detection laser beam, which is angled at a first angle to each of the two atomic beams to enhance dynamic range by enabling velocity selectivity of atoms used in detecting the atom interference. For example, a detection laser is configured to generate fluorescence from atoms resonant with one or more detection laser beams. In some embodiments, the detection beam is configured to detect absorption of atoms resonant with one or more detection laser beams. An angle θ is introduced between the detection beam and the atomic beam to provide velocity selectivity in the detected atom signal via the Doppler shift associated with the detection beam wave-vector and the atomic velocity. This reduces the spread in atomic velocities which are effectively detected such that contrast is maintained across larger accelerations. For example, the Doppler effect is used by angling the detection beam with respect to the atomic beam after the interferometer interrogation sequence in order to decrease the longitudinal velocity width of atoms contributing to the signal. When the detection beam is tilted into the atomic beam direction by an angle θ, the fluorescence resonance condition for atoms with different velocities are shifted by $$\Delta f = \frac{v}{\lambda}\sin\theta$$

and the width of the atomic beam velocity distribution is decreased.

In 1008, a processor is provided to determine an inertial measurement based at least in part on the atom interference detected using the detection laser. For example, a processor is provided to determine an inertial measurement based at least in part on the atom interference detected using the detection laser. In some embodiments, a hyperfine energy level distribution sensor converts the pair of photodetector signals ($PD_1$, $PD_2$) from atomic interferometer into a pair of values ($N_1$, $N_2$) that are proportional to the number of atoms in the hyperfine energy state F=4 (e.g., hyperfine energy state of alkali atoms such as cesium, rubidium, etc.) and outputs them to phase pair calculator. A phase pair calculator inputs values ($N_1$, $N_2$) from hyperfine energy level distribution sensor and outputs a pair of atomic phases ($\varphi_1$, $\varphi_2$) which are used to calculate linear acceleration and rotation with respect to beam direction K.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An atom interferometer device for inertial sensing, comprising:
    one or more thermal atomic sources to provide one or more atomic beams;
    a state preparation laser disposed to provide a state preparation laser beam nominally perpendicular to each of the one or more atomic beams;
    a set of lasers disposed to provide interrogation laser beams that interrogate the one or more atomic beams to assist in generating atom interference;
    a detection laser disposed to provide a detection laser beam, which is angled at a first angle to each of the one or more atomic beams to enhance dynamic range by enabling velocity selectivity of atoms used in detecting the atom interference.

2. The device as in claim 1, wherein the velocity selectivity of atoms is achieved using an angle from perpendicular to one of the one or more atomic beams.

3. The device as in claim 2, wherein the angle from perpendicular comprises a less than ten degree angle from perpendicular.

4. The device as in claim 2, wherein the angle from perpendicular comprises a ten to less than twenty degree angle from perpendicular.

5. The device as in claim 2, wherein the angle from perpendicular comprises a twenty to less than thirty degree angle from perpendicular.

6. The device as in claim 2, wherein the angle from perpendicular comprises a thirty to less than fifty degree angle from perpendicular.

7. The device as in claim 2, wherein the angle is adjusted from perpendicular for each of the one or more atomic beams to adjust the dynamic range.

8. The device as in claim 2, wherein the detection laser beam is modulated for a Doppler shift associated with the angle from perpendicular to each of the one or more atom beams.

9. The device as in claim 2, wherein the detection laser beam is modulated for a plurality of Doppler shifts to address different populations in the one of the one or more atomic beams.

10. The device as in claim 2, wherein a detection beam steering mirror is adjusted dynamically to increase or decrease a dynamic range depending on sensor motion and a detection beam frequency is adjusted to an appropriate Doppler shift.

11. The device as in claim 2, where an optical power in the detection laser beam is adjusted dynamically to increase or decrease a dynamic range depending on a sensor motion.

12. The device as in claim 1, wherein a second detection laser beam is angled at a second angle to the one of the one or more atomic beams to enhance dynamic range by enabling velocity selectivity of atoms used in detecting the atom interference, wherein the first angle and the second angle are different.

13. The device as in claim 12, wherein the second detection laser beam is generated by the detection laser.

14. The device as in claim 1, wherein the thermal atomic source is collimated using a mechanical collimator.

15. The device as in claim 14, wherein the mechanical collimator achieves a collimation to one of the following ratio ranges: from 50:1 to less than 100:1, from 100:1 to less than 200:1, or from 200:1 to less than 300:1.

16. The device as in claim 1, wherein the laser interrogation beams assisting in generating atom interference comprise three Raman beams.

17. The device as in claim 16, wherein each of the three Raman beams are retroreflected.

18. The device as in claim 17, wherein retroreflection is achieved using a single mirror or three mirrors.

19. The device as in claim 16, wherein the set of lasers comprise three Raman lasers that produce the three Raman beams.

20. The device as in claim 16, wherein a first separation of a first interrogation region of a first Raman beam of the three Raman beams with the one of the one or more atomic beams to a second interrogation region of a second Raman beam of the three Raman beams with the one of the one or more atomic beams and a second separation of the second interrogation region of the second Raman beam of the three Raman beams with the one of the one or more atomic beams to a third interrogation region of a third Raman beam of the three Raman beams with the one of the one or more atomic beams are equivalent.

21. The device as in claim 1, wherein the state preparation laser beam is split to generate two state preparation laser beams for interaction with the one or more atomic beams in two separate interaction regions.

22. The device as in claim 1, wherein the detection laser beam is split to generate two detection laser beams for interaction with the one or more atomic beams in two separate detection regions.

23. The device as in claim 1, further comprising a processor configured to determine an inertial measurement based at least in part on the atom interference detected using the detection laser.

24. The device as in claim 1, wherein the one or more thermal atomic sources comprise two atomic sources that provide two atomic beams.

25. The device as in claim 1, wherein the set of lasers to provide interrogation laser beams comprise a set of Raman lasers to provide Raman interrogation laser beams.

26. A method for inertial sensing using an atom interferometer device, comprising:
    disposing one or more thermal atomic sources to provide one or more atomic beams;
    disposing a state preparation laser to provide a state preparation laser beam nominally perpendicular to one of the one or more atomic beams;
    disposing a set of lasers to provide interrogation laser beams that interrogate the one or more atomic beams to assist in generating atom interference; and
    disposing a detection laser to provide a detection laser beam, which is angled at a first angle to each of the one or more atomic beams to enhance dynamic range by enabling velocity selectivity of atoms used in detecting the atom interference.

27. A method for inertial sensing using an atom interferometer device, comprising:
   providing one or more thermal atomic sources to provide one or more atomic beams;
   providing a state preparation laser to provide a state preparation laser beam nominally perpendicular to one of the one or more atomic beams;
   providing a set of lasers to provide interrogation laser beams that interrogate the one or more atomic beams to assist in generating atom interference;
   providing a detection laser to provide a detection laser beam, which is angled at a first angle to each of the one or more atomic beams to enhance dynamic range by enabling velocity selectivity of atoms used in detecting the atom interference; and
   providing a processor to determine an inertial measurement based at least in part on the atom interference detected using the detection laser.

* * * * *

UNITED STATES PATENT AND TRADEMARK OFFICE
CERTIFICATE OF CORRECTION

| | |
|---|---|
| PATENT NO. | : 10,288,428 B1 |
| APPLICATION NO. | : 15/894488 |
| DATED | : May 14, 2019 |
| INVENTOR(S) | : Arman Cingoz et al. |

Page 1 of 1

It is certified that error appears in the above-identified patent and that said Letters Patent is hereby corrected as shown below:

In the Specification

In Column 4, Line 62, before "atomic", delete "$m_F$=O" and insert --$m_F$=0--, therefor.

In Column 13, Line 11, delete "K." and insert -- --, therefor.

Signed and Sealed this
Twenty-eighth Day of January, 2020

Andrei Iancu
*Director of the United States Patent and Trademark Office*